(12) United States Patent
Suzuki et al.

(10) Patent No.: US 6,299,129 B1
(45) Date of Patent: Oct. 9, 2001

(54) ACTUATOR DEVICE WITH VALVE

(75) Inventors: Yuzuru Suzuki; Sakae Fujitani; Naoyuki Harada, all of Shizuoka-ken (JP)

(73) Assignee: Minebea Co., Ltd. (JP)

( * ) Notice: Subject to any disclaimer, the term of this patent is extended or adjusted under 35 U.S.C. 154(b) by 0 days.

(21) Appl. No.: 09/459,028

(22) Filed: Dec. 10, 1999

(30) Foreign Application Priority Data

Dec. 11, 1998 (JP) .................................................. 10-353414

(51) Int. Cl.[7] .................................................. F16K 31/02
(52) U.S. Cl. .................. 251/129.11; 251/65; 251/129.09
(58) Field of Search .............................. 251/65, 129.04, 251/129.09, 129.15, 129.11; 335/230

(56) References Cited

U.S. PATENT DOCUMENTS

| 4,976,237 | * | 12/1990 | Bollinger | ........................ 123/339 |
| 5,785,296 | * | 7/1998 | Peube et al. | .................. 251/129.11 |
| 6,026,343 | * | 3/2001 | Kato et al. | ...................... 251/129.15 |
| 6,206,342 | * | 3/2001 | Beck | ............................... 251/129.11 |
| 6,224,034 | * | 5/2001 | Kato et al. | ............................ 251/164 |

* cited by examiner

Primary Examiner—Kevin Shaver
Assistant Examiner—D. Austin Bonderer
(74) Attorney, Agent, or Firm—Howell & Haferkamp LC

(57) ABSTRACT

In a device wherein a rotary shaft is provided in a pipe through which a fluid is passed, a butterfly valve is installed in the pipe, an actuator and an angle sensor are directly arranged on the outer end of the pipe of the rotary shaft, and angle control for adjusting an angle detection signal to a command value is performed to thereby adjust an amount of a fluid passing through the pipe. An actuator includes a rotor composed of a permanent magnet rotatably supported by the rotary shaft and has two magnetic poles, namely, N and S poles, and a stator composed of a winding wrapped around a cylindrical core formed of a soft magnetic member. Two phase separating members are provided on a circumference of the core so that the phase separating members are disposed to geometrically form an angle of substantially 180 degrees relative to each other, and two independent sets of coils are wound around the core at a substantially uniform density in a winding region on a core circumference that has been divided by the phase separating members.

18 Claims, 12 Drawing Sheets

201

ACTUATOR DEVICE WITH VALVE

BACKGROUND OF THE INVENTION

1. Field of the Invention

The present invention relates to an actuator device with a valve for use in a device for controlling a flow rate of a fluid in a pipe wherein a toroidal core type actuator is used to directly open or close a valve based on an angle command value and, more particularly, to an actuator device with an engine throttle valve to be mounted on a vehicle.

2. Description of Related Art

Recently, a drive by wire system is widely used to improve automobile drivability and to accomplish countermeasures for exhaust gas. The drive by wire system, which does not use an accelerator cable, electrically detects by a sensor a depression amount of an accelerator pedal stepped by a driver and drives an engine throttle valve by a motor, thus operating the engine throttle valve completely independently of the operation of the accelerator pedal performed by the driver. As a result, the drive by wire system makes it possible to control engine output while always securing an appropriate air-fuel ratio for each situation, and therefore has been attracting attention and spreading as one of solutions to environmental problems.

In currently available drive by wire systems, however, throttle valves are usually driven by a combination of DC motors and decelerators as described in Japanese Laid-open Patent Application No. 5-240070 and U.S. Pat. No. 5,777,412. This is because driving a throttle valve requires a large torque ranging from about 30 to about 60 Ncm (230 Ncm in a freeze condition), so that the required torque cannot be provided by a motor alone unless torque is increased by the intermediary of a decelerator. Using the decelerator, however, adds to cost of a system and deteriorates reliability. Above all, the conventional drive by wire systems have a shortcoming in that highly accurate flow rate control cannot be achieved due to backlash of gears or the like.

There has been also known a direct drive system that uses a toroidal core type actuator having a rotary shaft that repetitively rotates. If an operating angle range of the rotary shaft is limited to about 0 degree to about 90 degrees, then the torque characteristic depends solely on an input current value and not depends on the angle. This characteristic is ideally suited for controlling rotational angles (the details will be described hereinafter). Making use of this characteristic, it is possible to control a flow rate with high accuracy by providing a pipe through which a fluid passes with a shaft orthogonalized with respect to an axis of the pipe, attaching a butterfly valve to the shaft, and by controlling the angle of the valve. This technology has been applied to a variety of attempts to directly drive an engine throttle valve. However, required torque is large for a size (e.g. a diameter of about 70 mm and a length of about 70 mm). Thus, no actuators that are adequate for practical use have been available.

However, high-performance magnet made of a rare earth element has been developed, leading to prospects of accomplishing rotor magnets in appropriate sizes that are capable of producing the required torque of about 30 to about 60 Ncm for driving throttle valves. Stators have been presenting shortcomings in that workability of toroidal winding process itself is poor, handling after the winding process is difficult, and accomplishing dimensional accuracy is difficult, either. Therefore, the stators have been disadvantageous in that it is difficult to install onto apparatuses with high accuracy, which has been a cause of higher cost.

SUMMARY OF THE INVENTION

The present invention has been made with a view toward solving the problem described above. It is an object thereof to provide an actuator device with a valve that overcomes shortcomings of an actuator for opening/closing a valve, which is comprised of a combination of a decelerator and a DC motor, and that is capable of adjusting a flow rate at low cost and with high accuracy. Preferably it is an object of the present invention to provide an on-vehicle actuator device with an engine throttle valve.

To this end, according to the present invention, there is provided a toroidal core type actuator comprising: a rotor composed of a permanent magnet rotatably supported on a rotary shaft thereof and has at least two magnetic poles of different polarity and a stator composed of a winding wrapped around a cylindrical core formed of a soft magnetic member disposed outside of said rotor via a minute air gap, wherein at least two phase separating members composed of a nonmagnetic material are arranged on said core equidistantly to each other, and coils are wound on winding regions provided between two adjacent phase separating members on said core at a substantially uniform density.

In a preferred form of the present invention, there is provided a toroidal core type actuator device with a valve for adjusting a flow rate in a pipe wherein a pipe through which a fluid is passed in provided with a rotary shaft to which a valve for adjusting a flow rate is fixed, an actuator and an angle sensor are arranged on an extended portion of said rotary shaft, and said valve is rotated with a torque corresponding to an output current value of an actuator driving circuit on the basis of an angle command value supplied to a control circuit so as to adjust a flow rate in the pipe; said actuator device with a valve comprising: a rotor composed of a permanent magnet rotatably supported on a rotary shaft thereof and has at least two magnetic poles of different polarity and a stator composed of a winding wrapped around a cylindrical core formed of a soft magnetic member disposed outside of said rotor via a minute air gap, wherein at least two phase separating members composed of a nonmagnetic material are arranged on said core equidistantly to each other, and coils are wound on winding regions provided between two adjacent phase separating members on said core at a substantially uniform density.

In a preferred form of the present invention, the fluid is air, and the actuator and the angle sensor are integrally installed in an engine throttle body.

In another preferred form of the present invention, the phase separating members are made of an insulative resin.

In a further preferred form, the phase separating members are at 10 degrees or less as central angle thereof the core circumference.

In yet another preferred form, an external diameter of a cylindrical core of an actuator is 70 mm or less, a length $Y_1$ (mm) of an air gap formed by a spacing between an inside diameter of the core and an outside diameter of a rotor magnet is set to be $1.5 \text{ mm} \leq Y_1 \leq 5$ mm, a length $Y_2$ (mm) of an air gap formed by a spacing between an innermost diameter of the phase separating member and the outside diameter of the rotor magnet is set to be $Y_1 - Y_2 \leq 0.5$ mm, and the two sets of coils wrapped around the core is formed of three to four layers.

In still another preferred form, the phase separating members are integrally provided with insulating portions for electrically insulating the core and the winding.

In a further preferred form, at least one of the phase separating members is provided with a coil hooking terminal.

In a further preferred form, the cylindrical core (preferably, a surface thereof has been provided with insulation treatment) is made by forming a soft and thin magnetic strip of a uniform width into a roll shape.

In a further preferred form, the roll-shaped soft and thin magnetic strip has a tapered portion that gradually and continuously spreads wider from an innermost circumferential end of a rolling start portion.

In a further preferred form, the cylindrical core is formed by wrapping a pipe-shaped soft magnetic core member with a soft and thin magnetic strip having a uniform width into a roll shape, a surface thereof being provided with insulation treatment.

BRIEF DESCRIPTION OF THE DRAWINGS

FIGS. 10A through 10C shows a method for forming a core wherein FIG. 10A shows a thin strip having a uniform width before rolling, FIG. 10B shows the strip at a rolling start, and FIG. 10C shows a completed core after the rolling.

FIGS. 11A through 11C shows a method for forming a core wherein FIG. 11A shows a rolling start, FIG. 11B shows a completed core after the rolling, and FIG. 11C shows a rolling start of another piece of material;

FIGS. 13A and 13B illustrate a method for forming a core with a pipe material wherein FIG. 13A shows a winding start, and FIG. 13B shows a completed core;

DESCRIPTION OF THE PREFERRED EMBODIMENTS

The present invention will be now described by reference to the accompanying drawings.

Figure 1:
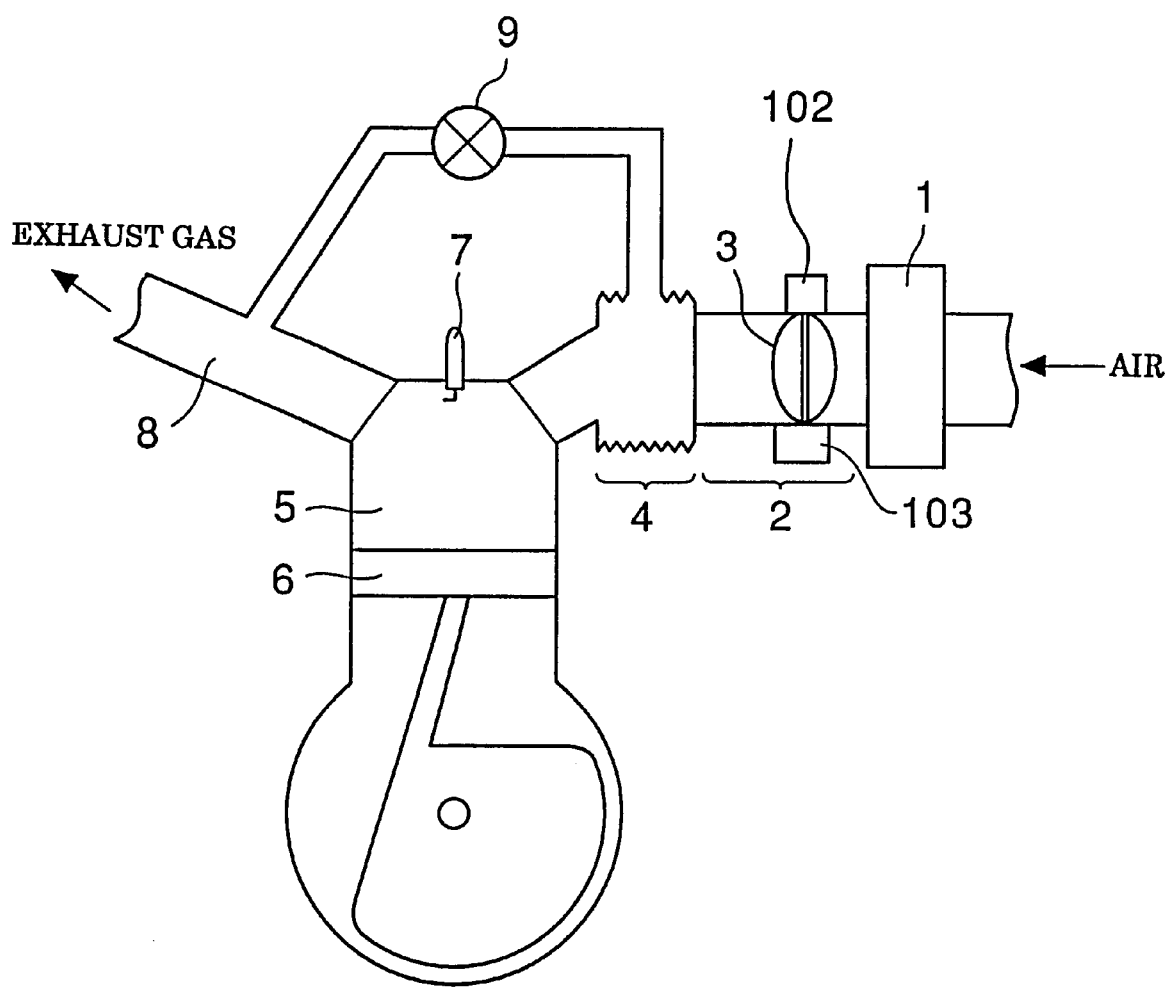
FIG. 1 shows for explanatory purpose a schematic configuration of a neighborhood of an engine throttle valve of a gasoline engine that employs an actuator device in accordance with the present invention.

First, a description will be given of an outline of an operation of a gasoline engine to which an actuator device in accordance with the present invention is preferably applied. FIG. 1 shows a mechanism in a neighborhood of an engine throttle valve of a gasoline engine.

Referring to FIG. 1, air flows in a direction of an arrow at right and is adjusted to have an appropriate flow rate through an air filter 1 and a butterfly valve 3 serving as a throttle valve at center of a throttle body 2, then it passes through an intake manifold 4 into a cylinder 5. Gasoline passes through the intake manifold 4 and enters the cylinder 5. The gasoline and air captured in the cylinder 5 are hermetically sealed in the cylinder 5 by diverse valves (not shown in FIG. 1). and ignited and exploded by an electric spark produced by a spark plug 7. An explosive power produced at this time pushes a piston 6 down to generate mechanical power. Exhaust gas after combustion is discharged through an exhaust 8. The engine is an example that employs an exhaust gas recirculation (EGR) system in which a part of the combustion gas is fed back to the intake manifold 4 through a valve 9 as part of measures for anti-exhaust gas.

Figure 2:
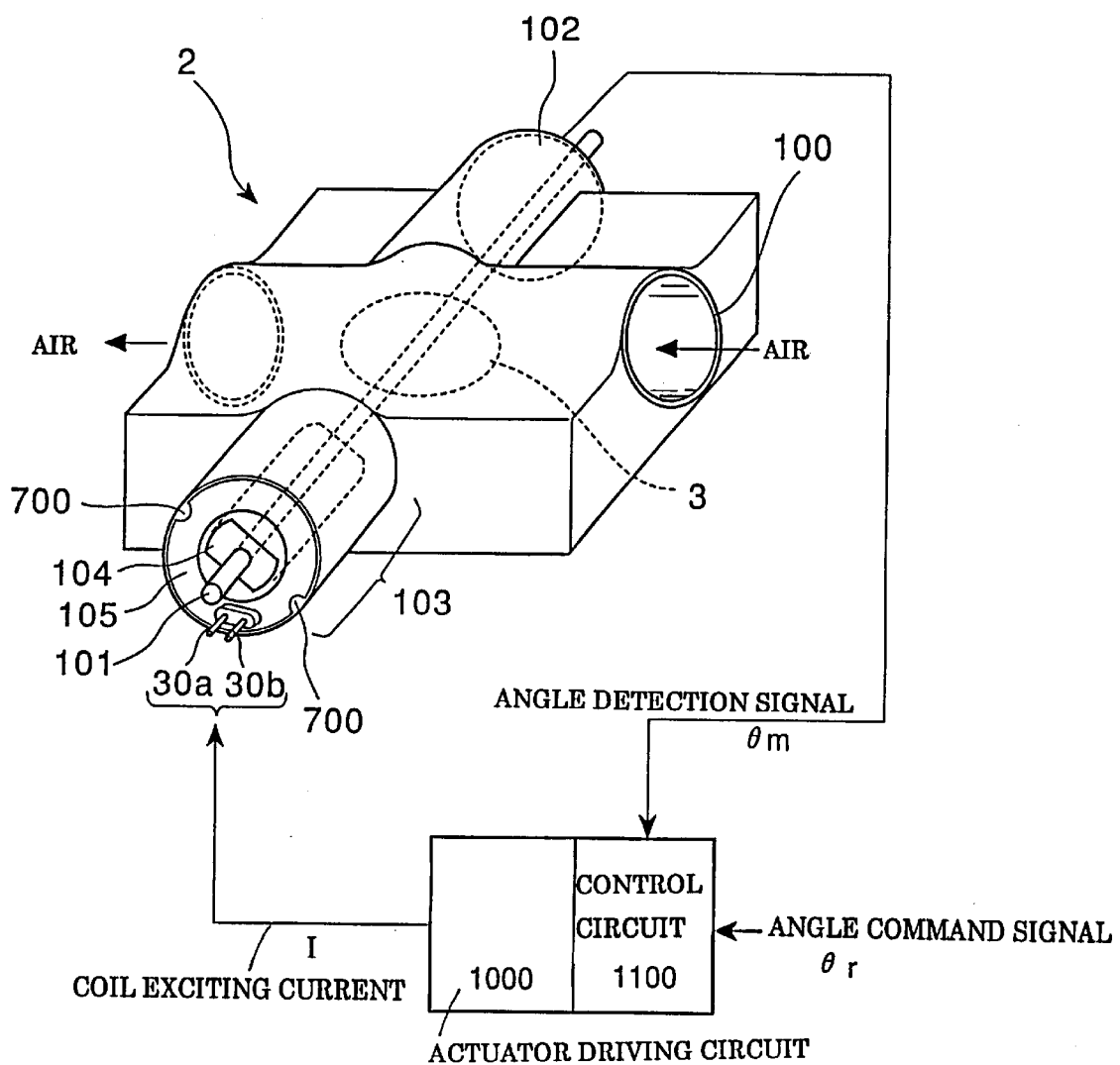
FIG. 2 is an explanatory diagram showing angle control of a butterfly valve of a gasoline engine shown in FIG. 1.

FIG. 2 presents an explanation of angle control of the butterfly valve 3 with the throttle body 2 shown in enlarged scale.

Referring to FIG. 2, a pipe 100 through which air passes runs from right to left. At center of the pipe 100, a rotary shaft 101, which is perpendicular to a central axis of the pipe 100, is rotatably supported (a bearing is not shown), and a butterfly valve 3 for adjusting a flow rate of air that has been previously described (the same valve as a throttle valve which will be discussed later, and hereinafter referred to as "valve") is provided at center of the rotary shaft 101. An actuator 103 is disposed on one end of the rotary shaft 101 and an angle sensor 102 is disposed on the other end thereof.

The actuator 103 is constituted by a rotor 104 which is directly secured to the shaft 101 and which will be discussed later, and a stator 105 which is provided with a toroidal winding and which will be discussed hereinafter. The actuator 103 is installed by fitting an outer peripheral surface of the stator 105 in the throttle body 2, which is composed by aluminum die casting in this embodiment. Two recesses 700 as positioning mechanisms in the outer periphery of the stator 105 are adapted to be fitted with protuberances on the throttle body 2. The positioning mechanisms 700 make it possible to adjust a waveform of a generated torque to a proper phase relationship (refer to FIG. 4 for more details) corresponding to a valve angle.

An example of flow rate control will be described in conjunction with FIG. 2. It is obvious that the flow rate of air changes according to an opening or closing angle of the valve 3. Hence, full explanation can be expected by describing the angle control of the valve 3 employing the actuator 103. The angle control is performed by an actuator driving circuit 1000, a control circuit 1100, the actuator 103, and the angle sensor 102.

Figure 4:
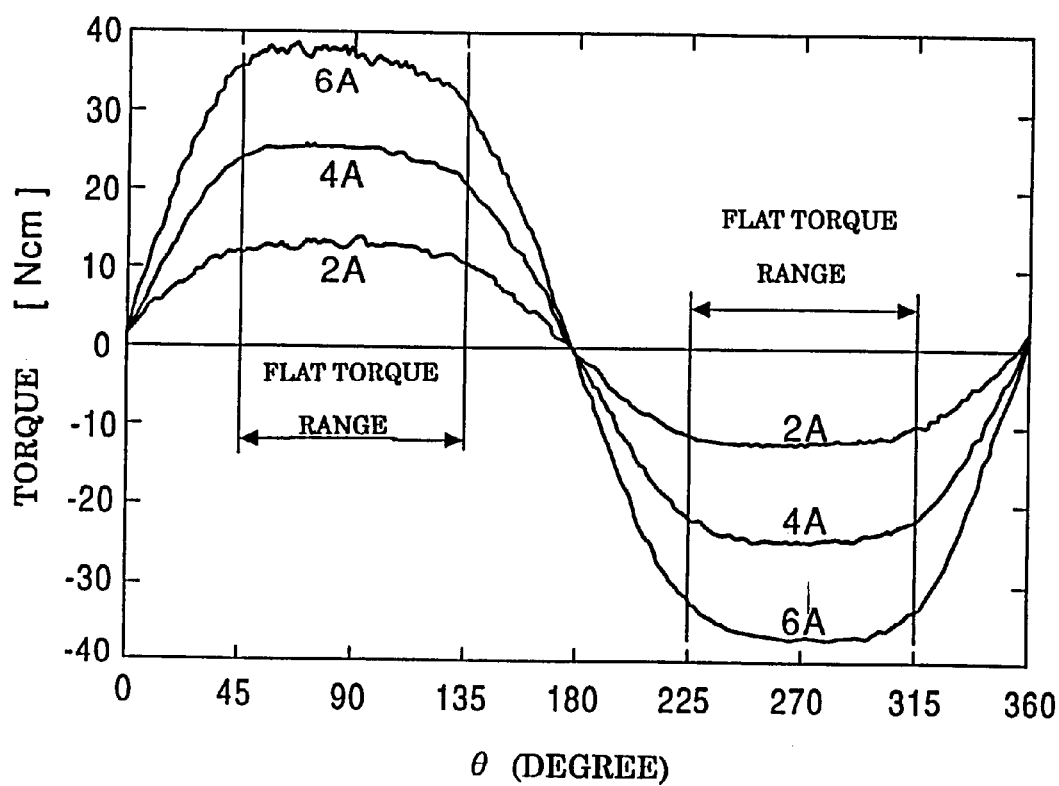
FIG. 4 illustrates an example of an angle-torque characteristic of an actuator device with a valve in accordance with the present invention.

First, when a current valve angle detection signal is denoted as $\theta_m$, which means that a current valve opening/closing angle is $\theta_m$, if a new angle command signal $\theta_r$ is supplied to the control circuit 1100, then an angle error of the current angle $\theta_m$ with respect to the angle command value $\theta_r$, $\Delta\theta=\theta_r-\theta_m<0$, increases. This causes the actuator driving circuit 1000 to supply a large coil exciting current I (see FIG. 4 showing a relationship between the coil exciting current I and generated torque) to the actuator 103 in order to reduce the angle error $\Delta\theta$ to zero ($\theta_m=\theta_r$) as soon as possible. As a result, the valve 3 immediately moves to a vicinity of an angle command value $\theta_r$ at a high torque and a high speed. When $\theta_m$ reaches the vicinity of $\theta_r$, the angle error $\Delta\theta>0$ gradually decreases, so that the coil exciting current I reduces as $\Delta\theta$ decreases and generated torque decreases accordingly. Finally, the coil exciting current I becomes zero when $\Delta\theta=0$ ($\theta_m=\theta_r$), generated torque of the actuator also becomes zero, so that the valve 3 stops at a position corresponding to the angle command value $\theta_r$. If, for example, the valve 3 moves beyond the angle command $\theta_r$ due to any reason, then the angle error $\Delta\theta=\theta_r-\theta_m>0$ occurs. If $\Delta\theta>0$, then the coil is excited by reversing the direction of current from a case of $\Delta\theta<0$. Hence, a torque in an opposite direction is generated to cause the valve 3 to go back until it reaches an angle based on the angle command value $\theta_r$, or until $\Delta\theta=0$ is obtained. Furthermore, when a new angle command $\theta_r$ is supplied, a new angle error $\Delta\theta$ is generated, so that the magnitude and direction of the coil exciting current I are changed so as to obtain $\Delta\theta=0$ ($\theta_m=\theta_r$). Thus, as the new angle command value $\theta_r$ dynamically changes with time, the valve opening/closing angle $\theta_m$ can be changed to continuously follow the command value.

Figure 3A:
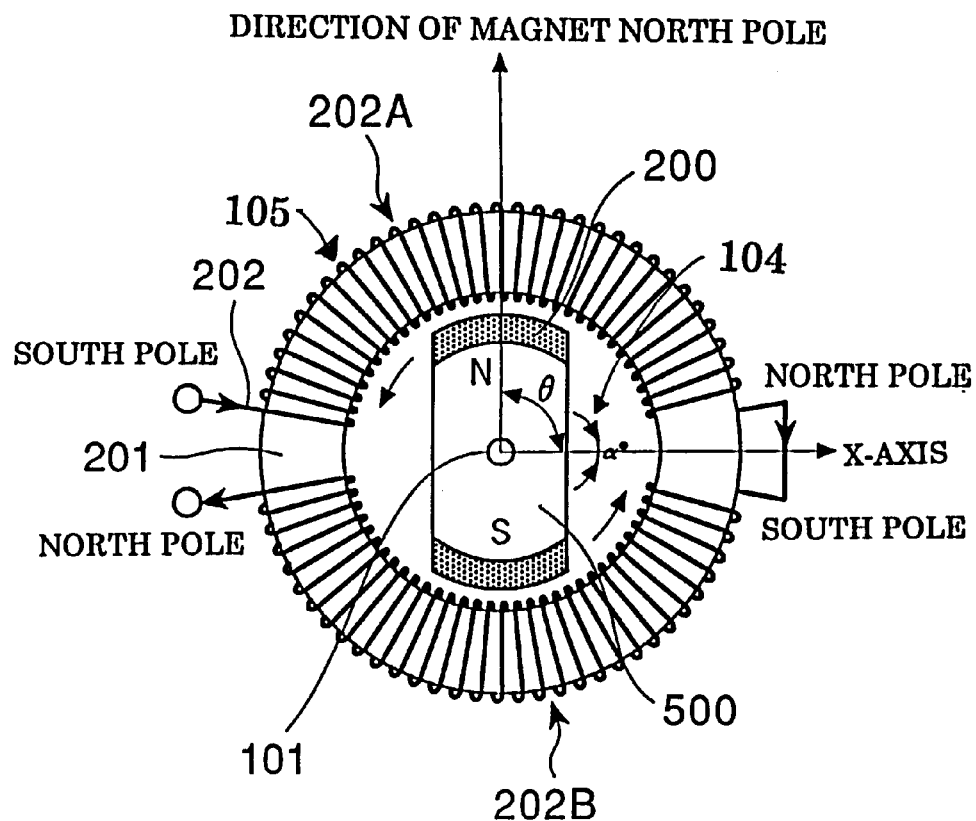
FIG. 3A is a front view of an actuator device with a valve in accordance with the present invention and FIG. 3B is a sectional view of a side surface portion of the actuator, which have been presented to explain a principle of the actuator device.
Figure 3B:
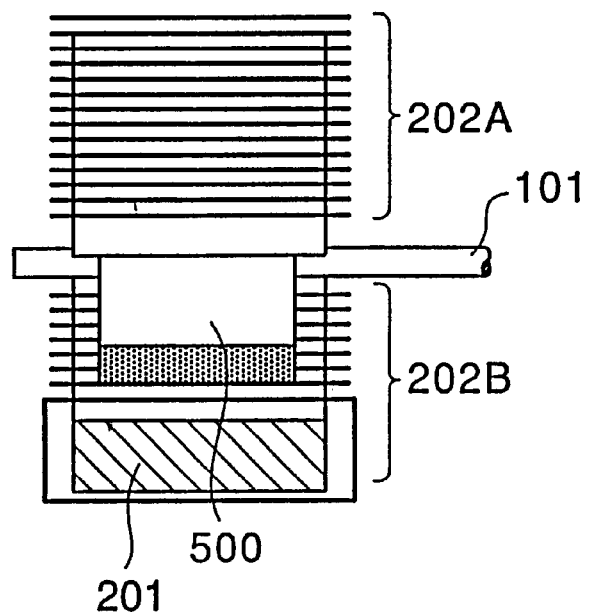

FIGS. 3A and 3B explain a principle of a toroidal actuator, wherein FIG. 3A is a front view of the actuator, and FIG. 3B is a sectional view of a side surface portion of the actuator. A coil shown in FIGS. 3A and 3B has a single layer, and a central angle (corresponding to $\beta$ in FIG. 14) formed by one pole of a magnet is 80 degrees.

A configuration of the actuator is as described below.

A rotor 104 is constructed by a magnet 200 (a sintered NdFeB type in this embodiment), a rotor yoke 500 (pure iron in this embodiment), and the rotary shaft 101. The rotary shaft 101 is rotatably secured by bearings. Although not shown, the bearings are usually installed on both ends of the valve 3 of the throttle body 2. The stator 105 is formed by providing the cylindrical core 201 serving as a core of the coil with electrical insulation treatment such as electrodeposition or epoxy resin coating, then winding one layer of a coil 202 around the core 201. An upper coil 202A in the coil 202 forms an A-phase coil, while a lower coil 202B forms a B-phase coil. In this embodiment, these upper coil 202A and lower coil 202B are connected in series.

The following will describe the principle of operation.

If a DC current is caused to flow in a direction of an arrow as shown in FIG. 3A, then the A-phase coil 202A is excited with the result that a winding start side will become south pole while a winding end side will become north pole. The B-phase coil 202B is excited with the result that a winding start side will become north pole while a winding end side will become south pole. Thus, the south pole of the rotor magnet 200 moves to the right end (north pole) of the coil 202, whereas the north pole of the rotor magnet 200 moves to the left end (south pole) of the coil 202, generating a torque in a direction of the arrow (counterclockwise). Causing a current to flow in an opposite direction through the coil 202, a torque generates in the opposite direction, namely, clockwise, thus permitting the angle of the valve to be controlled as previously mentioned. When the rotor magnetic poles are positioned in the state as shown in FIG. 3A, a maximum torque is generated, whereas zero torque is generated when the magnetic poles turn 90 degrees horizontal from the state shown in FIG. 3A. Furthermore, when the coil 202 is excited as shown in FIG. 3A, if the direction of the north pole of the coil 202 is denoted by an X-axis and an angle formed by the X-axis and the direction of the north pole of the rotor magnet 200 is denoted by $\theta$ degrees ($\theta=90$ degrees in FIG. 3A), then a torque in a counterclockwise direction is generated when $\theta$ ranges from 0 to 180 degrees, while a torque in a clockwise direction Is generated when $\theta$ ranges from 180 to 360 degrees. The torque is zero when $\theta$ is 0 and 180 degrees as previously mentioned.

FIG. 4 shows an example of a specific angle-torque characteristic wherein a relationship between coil exciting currents and generated torques is illustrated. An axis of ordinate indicates torque (Ncm), while an axis of abscissa indicates $\theta$ (degrees).

FIG. 4 particularly shows characteristics of the actuator shown in FIGS. 3A and 3B with respect to currents of 2 amperes (A), 4 amperes (A), and 6 amperes (A), respectively. As can be seen from FIG. 4, a torque flat range (a strict statement of the term is an angle range where a torgue value is within 90% of a peak value, hereinafter referred to as a "flat torgue range") of substantially 90 degrees is secured, meaning that an opening/closing angle of 90 degrees is secured when the valve is in operation. In addition, torque values increase in substantially direct proportion to input current values, meaning that stable and accurate valve angle control can be achieved by using the simple control circuit as previously described.

Figure 5:
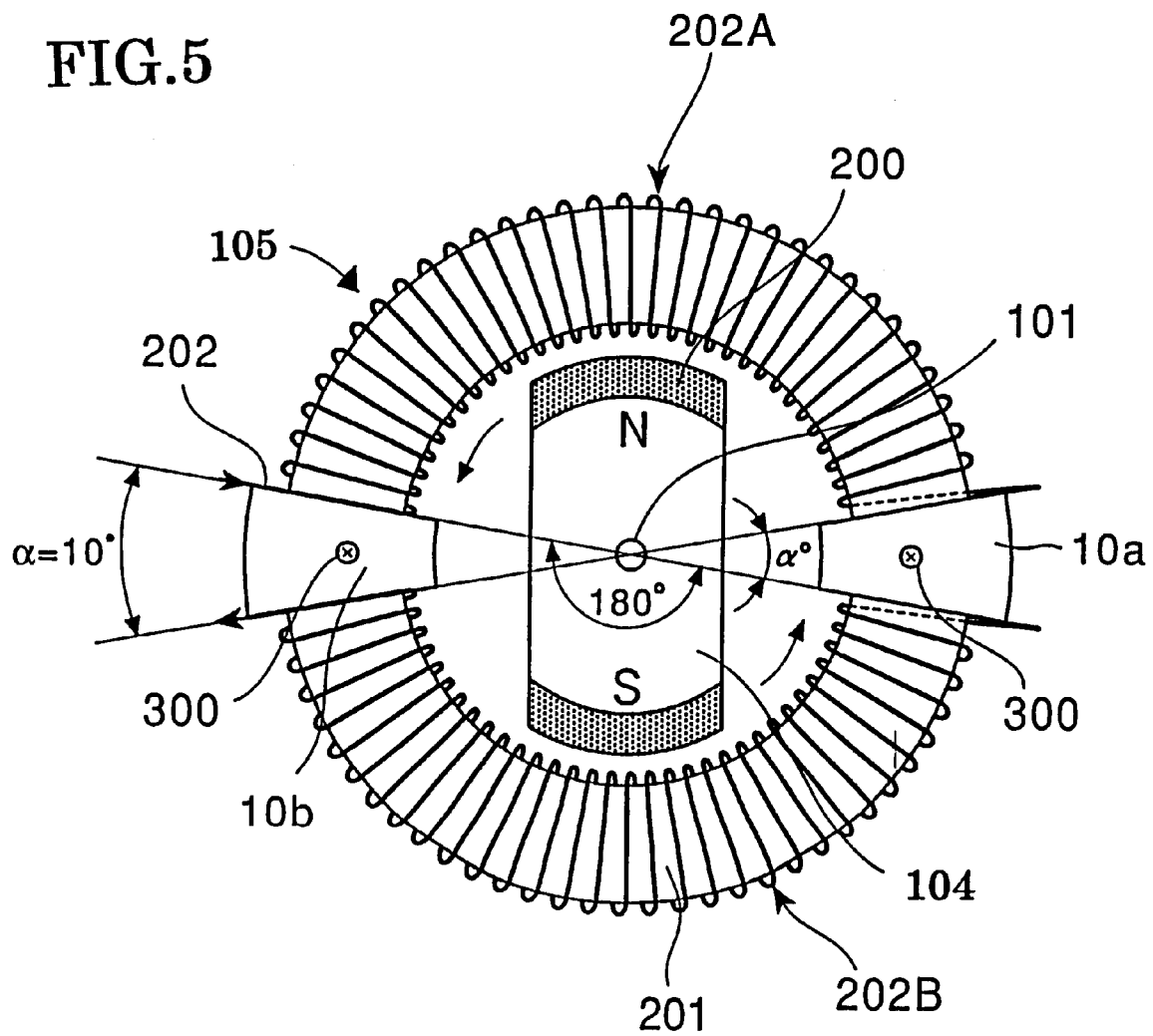
FIG. 5 shows a schematic configuration of a first embodiment of the present invention.

FIG. 5 shows a schematic configuration of a first embodiment of the present invention.

Characteristics of a stator structure in accordance with the present invention will be described. First, descriptions will be given of the phase separating members that are important elements in the present invention. In this embodiment, a phenolic resin, which is a nonmagnetic insulator, is used for the phase separating members. FIG. 5 shows a first embodiment having a stator provided with the phase separating members, and has basically the same configuration as that of the actuator described in conjunction with FIGS. 3A and 3B. Phase separating members 10a and 10b are disposed at two positions, namely, a winding start position and a winding end position (at positions that are 180 degrees apart from each other in this embodiment). The phase separating members 10a and 10b serve as banks at the winding start and the winding end of the coil. They function to prevent dislocated winding of the coil and permit winding at a certain high winding density. In actual winding, a plurality of layers of winding must be formed (the details will be described with reference to FIG. 14) to make the foregoing function particularly effective. As central angles $\alpha$ of the phase separating members 10a and 10b are decreased, a space allocated to the windings increases. This allows more winding per layer, so that it is advantageous in a characteristic aspect. In the first embodiment, a is set to 10 degrees because setting a to approximately 10 degrees makes it possible to secure an adequate winding space, an adequate space for inserting hooking terminals, and an adequate space for fixing the phase separating members themselves. The phase separating members 10a and 10b are secured to the core 201 by nonmagnetic screws 300 in this embodiment. The phase separating members 10a and 10b must be nonmagnetic because, if the phase separating members were composed of soft magnetic materials, then the phase separating members would constitute salient poles when the coil is excited, causing changes in circumferential permeance. As a result, a wide and stable flat torque range characteristic cannot be expected.

Figure 15:
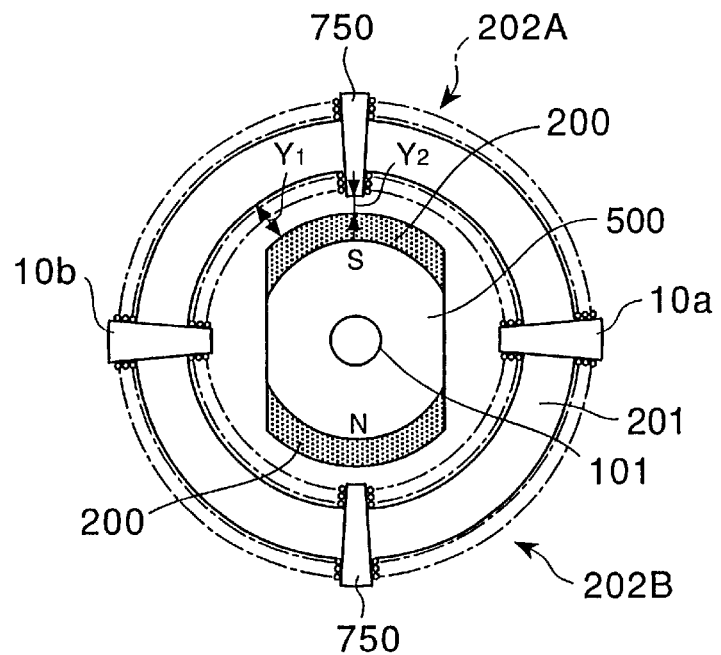
FIG. 15 shows a schematic configuration of a fifth embodiment in accordance with the present invention.

The central angles $\alpha$ of the phase separating members 10a and 10b sometimes differ at inside diameter and outside diameter due to various reasons, in which case the angles will mean those at portions that substantially constitute the banks of the winding. In the present invention, there are two phase separating members 10a and 10b, which is the same number as the rotor magnetic poles. However, the number may be increased to substantially four (see FIG. 15) by adding auxiliary phase separating member 750 as shown in FIG. 15 in order to prevent dislocated coiling or to ensure smooth coiling, or when the entire stator 105 is integrally molded using a resin (see FIG. 12). In the case of resin molding, providing four phase separating members will ensure stable seating of the stator 105 in molding dies.

Figure 12:
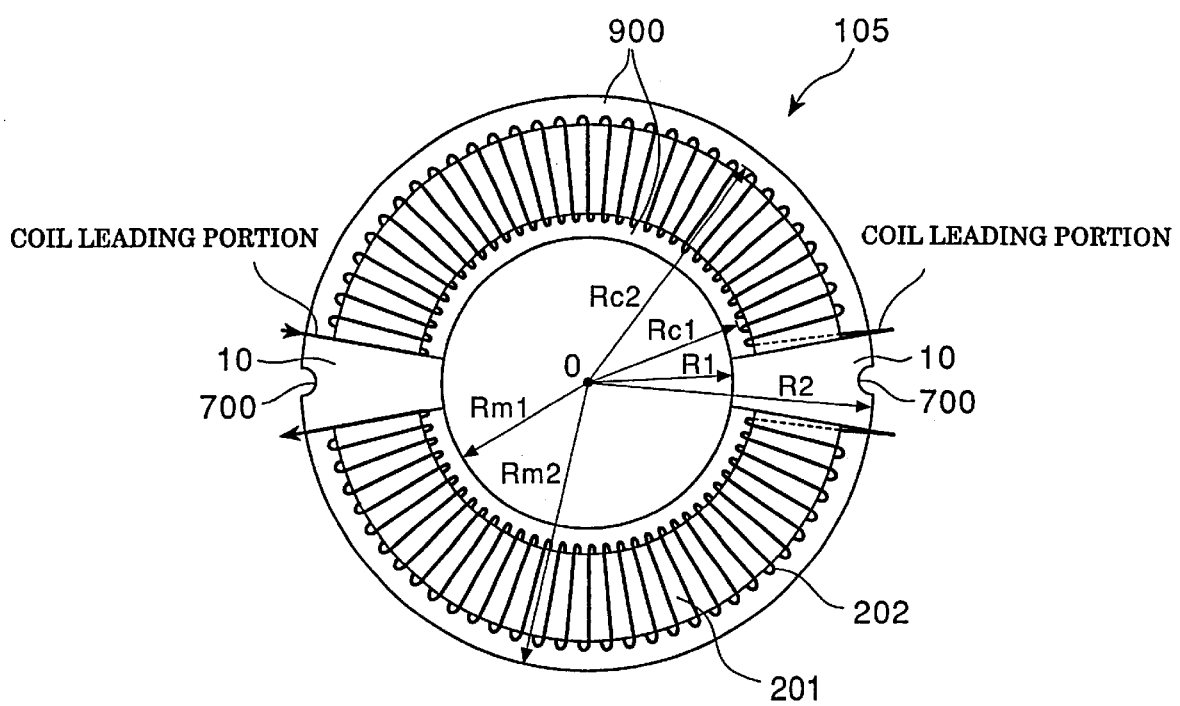
FIG. 12 shows a schematic configuration of a second embodiment of the present invention.

FIG. 12 shows a second embodiment formed by integrally molding the stator of the first embodiment shown in FIG. 5 with a resin (PPS in this embodiment).

As shown in FIG. 12, requisite inside diameter and outside diameter of the stator can be accurately obtained by fabricating the stator 105 after winding by making molding dies using an inside diameter portion R1 of the phase separating member 10, which represents an innermost diameter of the stator 105, and an outside diameter portion R2, which represents an outermost diameter of the stator 105, as references, then by performing integral molding with a resin 900. Especially for an innermost diameter Rc1 and an outermost diameter Rc2 of a coil 202 which tend to be varied at the end of winding finish, setting the innermost diameter R1 and the outermost diameter R2 of phase separating members 10 as follows will allow the entire coil 202 to be resin-molded as illustrated in FIG. 12, eliminating possibilities of dislocated winding or deforming, thus permitting easy handling:

$R1 = Rm1 \leq Rc1$ and $R2 = Rm2 \geq Rc2$ where $Rm1$ denotes an inside diameter after the resin molding, and $Rm2$ denotes an external diameter.

FIG. 12 shows an example of the stator wherein $R1 = Rm1$ and $R2 = Rm2$. Securing $Rm1 \geq Rc1$ will completely seals a coil of a core inside diameter portion by the resin, and securing $Rm2 \geq Rc2$ will completely seals a coil of a core outside diameter portion by the resin. This arrangement is advantageous in that, unlike the stator 105 wherein the finished winding dimension of the coil 202 is unstable, the reference dimensions can be obtained during assembly and installation and the coil composed of a copper wire will not be directly exposed in an engine throttle body subjected to severe operating environments since the entire stator 105 is resin-molded. The resin molding is extremely effective for improving reliability.

Referring back to FIG. 2, as previously mentioned, the actuator is designed to fit the outside diameter Rm2 of the molded stator 105 to the throttle body 2. In the stator shown in FIG. 2, the stator rotation stopping mechanisms 700 are provided in the phase separating members 10. It is obvious, however, that the stator rotation stopping mechanisms 700 may alternatively be provided In a stator resin portion after the resin molding or a flange for installation to a throttle body may be integrally provided with a resin. Furthermore, a mechanical stopper mechanism for restricting the rotation of the rotary shaft 101 may be incorporated in the actuator 103 by making use of the resin 900 and a part of the rotor core 500.

Obviously, the stator 105 may be fitted to the throttle body 2 by using the dimensions R1 and R2 providing the reference dimensions for the phase separating members 10, without molding the entire stator 105. In this case, auxiliary phase separating members 750 as shown in FIG. 15 may be added to enhance stability.

Figure 6:
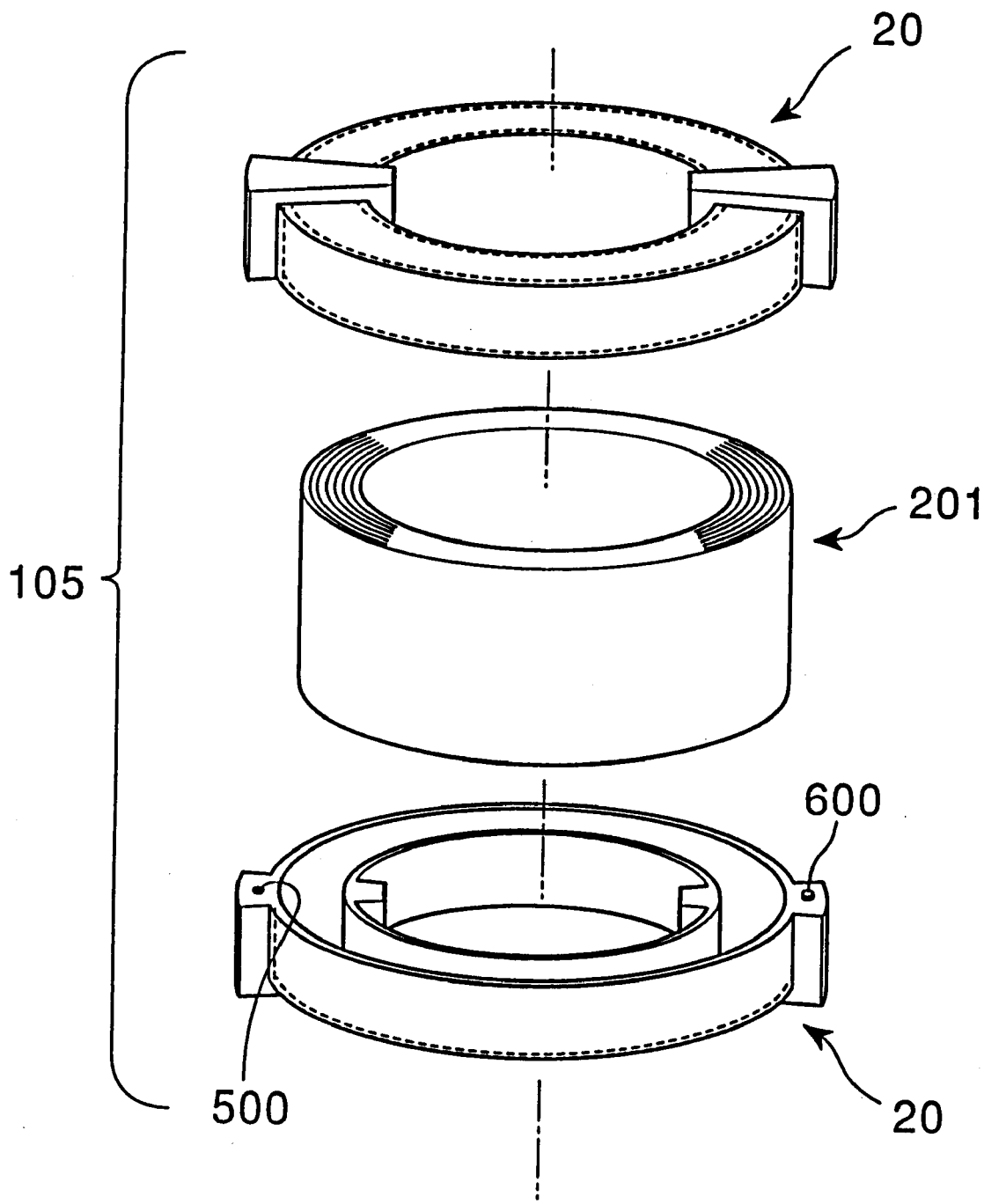
FIG. 6 shows a schematic configuration of a third embodiment of the present invention.

FIG. 6 shows a third embodiment illustrating a configuration of the stator 105.

In this embodiment, a one-piece phase separating member 20 is composed of unitary construction of a phase separating member and a coil insulator which is composed of a phenolic resin. However, PPS, PA or a resin containing about 45% of glass fiber for enhancing heat resistance and mechanical strength may be contained in the coil insulator. By sandwiching the core 201 with the one-piece phase separating members 20 from top and bottom thereof to configure the stator, the coil 202 (not shown) can be wound without the need for insulating the core 201. In addition, positioning of the phase separating members 10a and 10b can be set accurately in advance. The top and bottom portions of the one-piece phase separating members 20 share the same shape in this embodiment. However, they may have different shapes depending on the disposition of terminals (refer to FIGS. 8 and 9 for more details).

Figure 7:
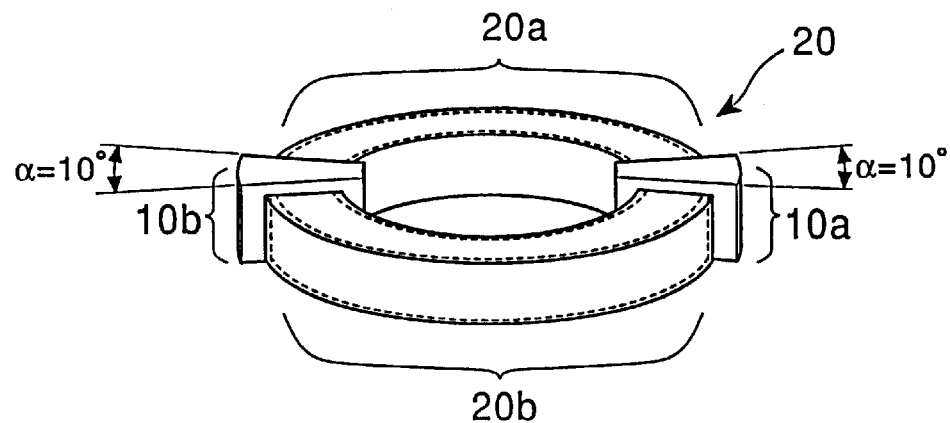
FIG. 7 shows an example of a one-piece type phase separating member.

FIG. 7 shows the upper one of the one-piece phase separating member 20 shown in FIG. 6.

Referring to FIG. 7, there are two portions 10a and 10b that correspond to the phase separating members. As in the case shown in FIG. 5, the phase separating members 10a and 10b share the same shape, and the central angle α is set to 10 degrees. The phase separating members 10a and 10b may be provided with a protuberance denoted by reference numeral 600 in FIG. 6 and a recess 500 in FIG. 6 that fit each other and are formed in portions that vertically face each other thereby to position the two phase separating members 10a and 10b. Reference numerals 20a and 20b of FIG. 7 indicate portions wherein windings will be provided. Preferably, these portions are made as thin in thickness as possible (preferably 0.5 mm or less) to prevent an increase in the resistance of the winding.

Figure 8:
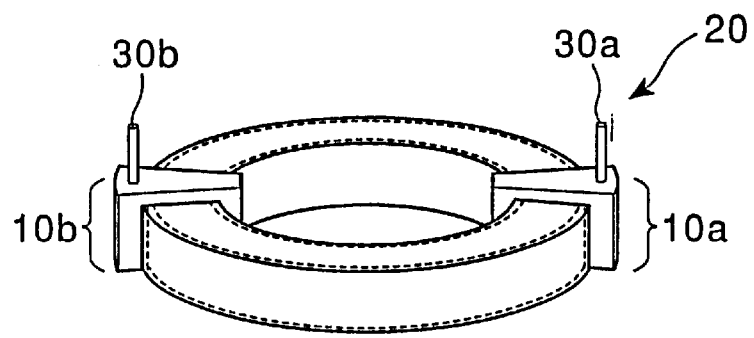
FIG. 8 shows an example of the one-piece type phase separating member.
Figure 9:
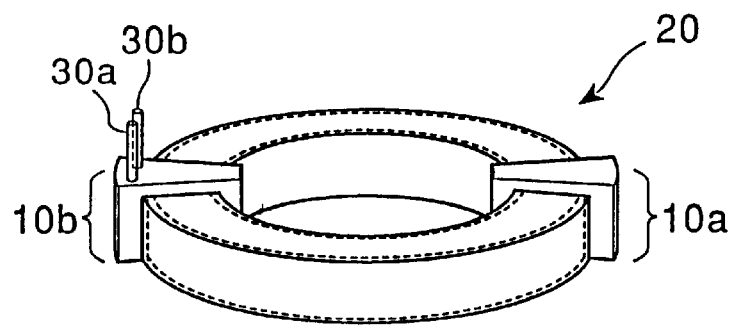
FIG. 9 shows further example of the one-piece type phase separating member.

FIGS. 8 and 9 illustrate a case where the one-piece phase separating member 20 which is the upper one shown in FIG. 6 is employed. They show an embodiment in which coil hooking terminals 30a and 30b are inserted in the phase separating member providing an adequate thickness, without the need for coiling.

With the foregoing arrangement, hooking coil winding start and end portions on the terminals prevents uncoiling and enables a stator permitting a quick finish to be accomplished. FIG. 8 shows a case wherein one terminal is provided on each of the two phase separating members 10a and 10b. However, two terminals 30a and 30b may be provided on only the phase separating member 10b to dispose the terminals on one of the phase separating members as shown in FIG. 9. It is obvious that the hooking terminals may be applied to the configuration shown in FIG. 5 wherein the phase separating members are provided independently. Furthermore, the hooking terminals do not have to be vertically oriented; they may be oriented differently as necessary.

FIGS. 10A through 10C and FIGS. 11A through 11C illustrate a manufacturing method of the core 201.

In the embodiment shown in FIG. 6, the core 201 has been cut into a cylindrical shape. This machining secures an accuracy of the core, whereas it inevitably leads to higher cost. FIGS. 10A through 10C and FIGS. 11A through 11C illustrate a method for making a core by rolling a thin strip, a surface of which has been provided with insulation treatment.

Figure 10A:
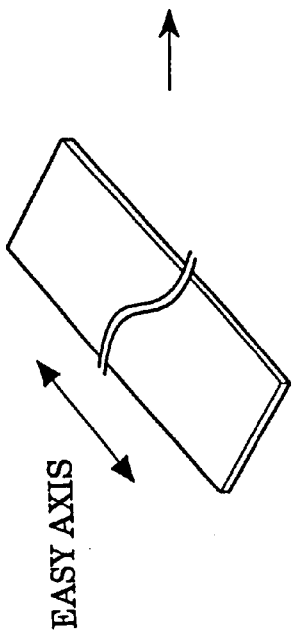
Figure 10B:
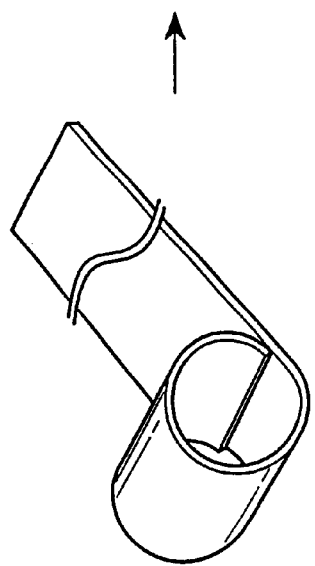
Figure 10C:
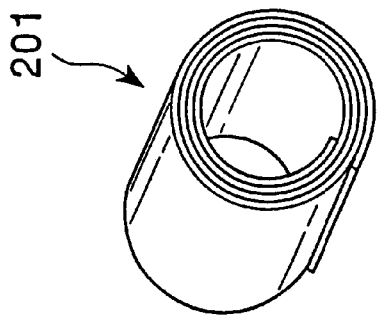

FIG. 10A shows a thin strip made of soft magnetic materials and has a uniform width before starting rolling, FIG. 10B shows a beginning of rolling process, and FIG. 10C shows a completed core 201 after rolled. The soft magnetic thin strip is typically formed of an electromagnetic steel plate which has its surface provided with insulation treatment and which is 0.2 mm to 0.5 mm thick. If the thin strip has magnetic anisotropy, it is preferable from the standpoint of magnetic characteristics to orient an easy axis in the longitudinal direction (in the direction of an arrow of FIG. 10A) of the thin strip.

Figure 11B:
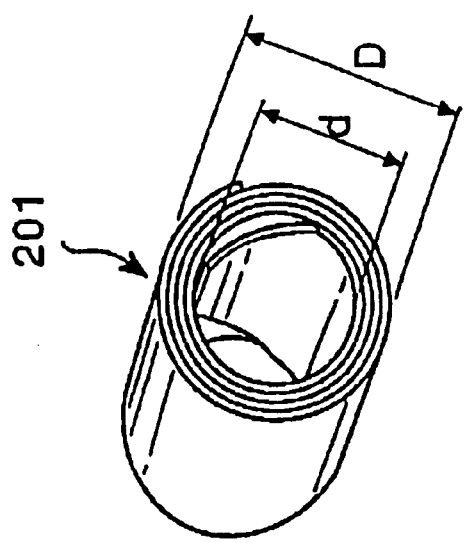
Figure 11A:
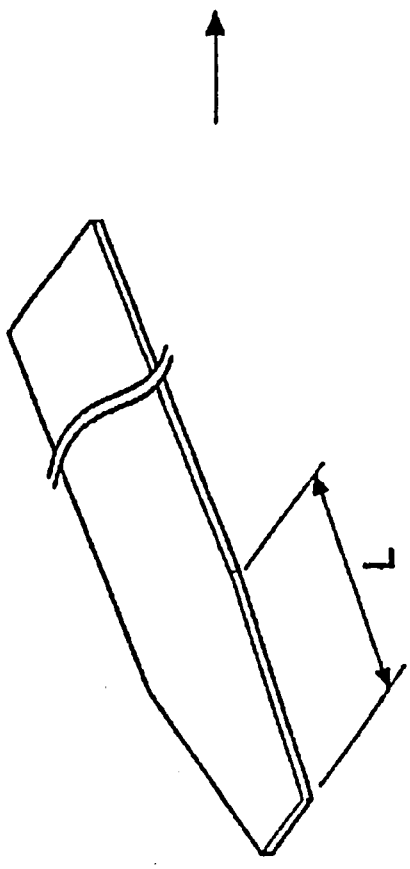
Figure 11C:
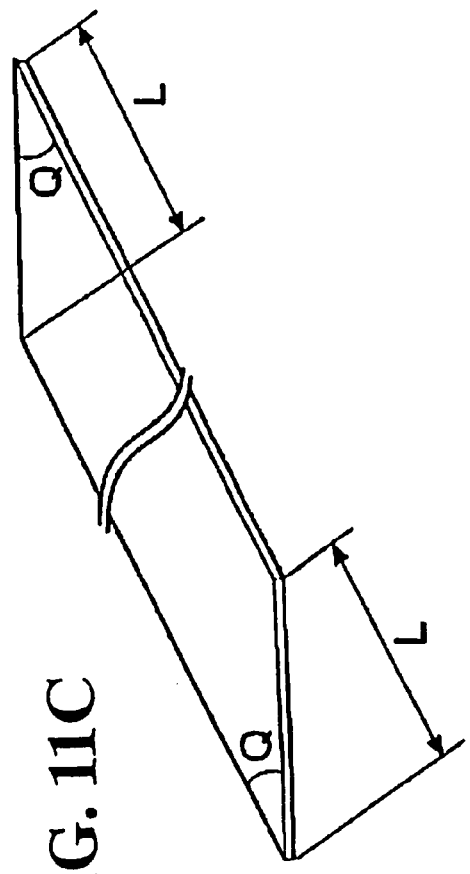

FIGS. 11A through 11C are explanatory diagrams of a method for making a core wherein FIG. 11A shows a state of a rolling start, FIG. 11B shows a completed core after rolled, and FIG. 11C shows another piece of material to be rolled.

FIGS. 11A through 11C differ from FIGS. 10A through 10C in that a distal end (a roll start) portion of the thin strip is tapered. In the case of the thin strip shown in FIGS. 10A through 10C, the circumferential permeance greatly changes at a rolling start, making the occurrence of a cogging torque and a torque ripple at the rolling start unavoidable. This leads to a shortcoming in that it is difficult to secure the torque characteristics that do not depend on an angle as previously mentioned. The thin strip provided with the tapered rolling start portion shown in FIGS. 11A through 11C presents gradual changes in the circumferential permeance, making it possible to control the occurrence of the cogging torque and the torque ripple. A length L of the tapered portion is preferably as long as possible to restrain the occurrence of the cogging torque and the torque ripple. However, as the taper portion becomes longer, an equivalent air gap accordingly becomes larger, undesirably leading to deterioration in torque characteristics. In FIGS. 11A and 11C, the tapered portion length L is set to $\pi d$ and it is set so that only the innermost circumference is tapered when the thin strip has been rolled. With this arrangement, the occurrence of a cogging torque and a torque ripple and deterioration in torque characteristics can be controlled to a minimum. FIG. 11A shows a state of a rolling start, and FIG. 11B shows a completed core 201 after rolled.

FIG. 11C illustrates a method for making a thin strip with tapered portion. According to this method, the thin strip has tapered portions of a length of L that are both shaped like knives at rolling start and end portions, respectively. This arrangement further reduces the chances of the occurrence of a cogging torque and a torque ripple, and also Improves a yield of material pieces from a thin strip as compared with the one shown in FIG. 11A, so that waste of a material can be avoided.

Figure 13A:
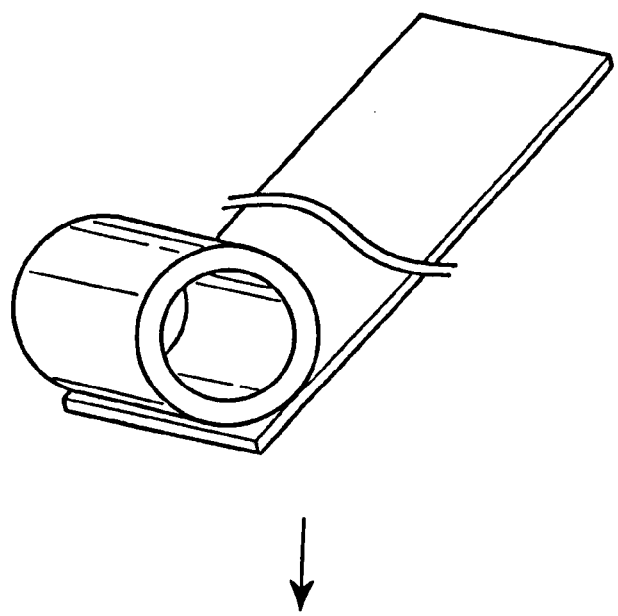
Figure 13B:
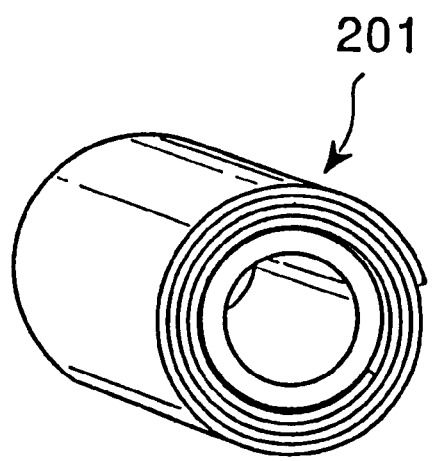

FIGS. 13A and 13B shows another fabricating method for still another core, wherein FIG. 13A shows a state of a rolling start, and FIG. 13B shows a completed core.

According to this method, a core is fabricated by using a pipe member as the winding core.

Using the pipe member composed of a soft magnetic materials as the winding core enables a core 201 with high dimensional accuracy to be accomplished. There are of course such advantages that a step at the rolling start of the thin strip restrains changes in circumferential permeance described in conjunction with FIGS. 10A through 10C, and that the tapered portion at the rolling start of the thin strip can be omitted. Preferably, the pipe member is thick to fulfill its function as a core and also to reduce the changes in permeance at the rolling start portion of the thin strip. Experimental results have indicated that the thickness of the pipe member preferably ranges from about five to about seven times the thickness of the thin strip. According to the method illustrated in FIGS. 13A and 13B, when the thickness of the pipe member was 1.0t in relation to the thickness 0.2t of the thin trip, the cogging torque was 1.35 Ncm, while the cogging torque was 1.15 Ncm when a machined core was used (approximately 17% improved), meaning that there should be substantially no problem.

Lastly, referring to FIG. 14, descriptions will be given of a relationship among an external dimension of an actuator, an air gap Y1 between an inside diameter of a core and an outside diameter of a rotor magnet, an air gap Y2 formed between innermost diameters of phase separating members and the outside diameter of the rotor magnet, and a number of winding layers of coil.

A size of an actuator that can be installed to an engine throttle valve driving apparatus is almost limited and the external dimension of the actuator is such that its diameter is 70 mm or less. It is easily inferred that the air gaps need to be properly set in order to provide as much winding as possible and to obtain as large torque as possible within the limited size. Experimental results have shown that a length $Y_1$ of an air gap formed by an inside diameter of the core 201 and an outermost diameter of the rotor magnet 200 inserted in the core 201 is preferably set to 1.5 mm$\leq Y_1 \leq$5 mm. Furthermore, it has been found that setting a length $Y_2$ of an air gap formed by innermost diameters of the phase separating members 10 and an outermost diameter of the rotor magnet 200 to $Y_1-Y_2 \leq$0.5 mm allows a coil to be evenly wound in most cases at a stable density even for a coil of a relatively more layers such as three or four layers.

Figure 14:
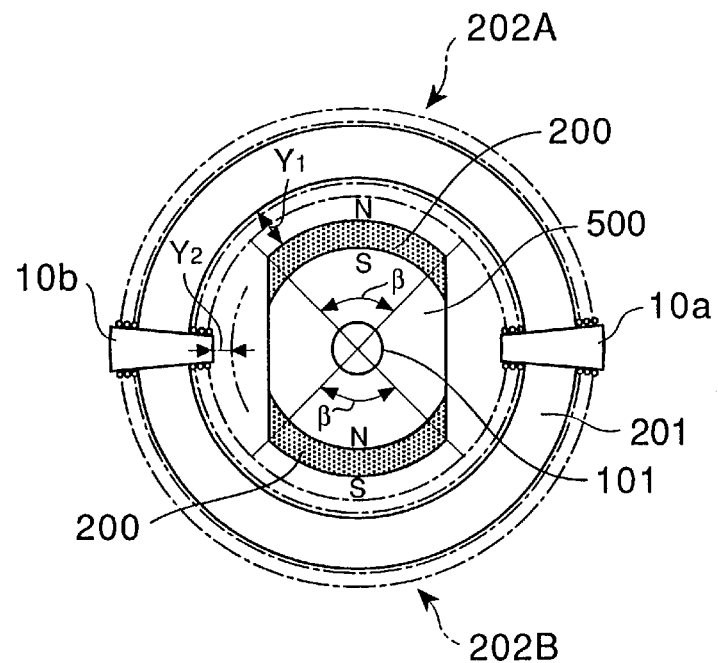
FIG. 14 shows a schematic configuration of a fourth embodiment in accordance with the present invention.

FIG. 14 shows a fourth embodiment.

FIG. 14 shows an example wherein an outside diameter of a stator is 65 mm, a length $Y_1$ of an air gap formed at an outermost diameter of a rotor magnet 200 is 3 mm, a length $Y_2$ of an air gap formed by an innermost circumferences of phase separating members 10a and 10b and an outermost diameter of the rotor magnet 200 is 0.4 mm, and a coil has three layers of winding. All the embodiments have been described above with the coil having a single layer of winding, whereas the coil of the embodiment shown in FIG. 14 has three layers. Like components will be assigned like reference numerals, and descriptions of components that are not directly connected to the invention will be omitted.

As previously described, it is essential to increase the number of winding layers of a coil to improve torque characteristics. On the other hand, as the number of winding layers increases, the winding height of a resulting coil increases, leading to a disadvantage that there will be more likelihood of dislocated winding. In the present invention, however, the phase separating members 10a and 10b are provided and setting is made to $Y_1-Y_2$=0.4 mm ($\leq$0.5 mm). Hence, projections of the phase separating members can be set to adequate heights within a range that does not interfere with the rotor magnet. With this arrangement, even when the coil has three layers of winding, banks of the phase separating members can be firmly secured, so that irregular winding can be prevented, allowing stable winding to be secured. Furthermore, the length $Y_1$ of the air gap formed by the inside diameter of the core 201, and the outermost diameter of the rotor magnet 200 inserted therein is 3 mm (1.5 mm$\leq Y_1 \leq$5 mm). Hence, when a magnet wire having a diameter of approximately 0.5 mm (a core wire diameter is 0.45 mm and a maximum diameter of a coated wire is 0.50 mm in this embodiment) is wound around the core 201 in three overlapping layers, a surface of a resulting coil will not interfere with the rotor magnet 200. Thus, configuring an actuator with three or four layers of winding is effective for improving torque characteristics. In this case, if $Y_1$ is set to smaller than 1.5 mm ($Y_1$<1.5 mm) rather than setting $Y_1$ to the range defined by 1.5 mm$\leq Y_1 \leq$5 mm, then $Y_1$ is too small, leading to a shortcoming in that a coil of three or four layers of winding will interfere with the rotor magnet. Conversely, if $Y_1$ is set to larger than 5 mm ($Y_1$>5 mm), then the shortcoming in which the coil interferes with the rotor magnet will not result. However, there will be a different shortcoming in that the larger $Y_1$ produces higher magnetic resistance. There will be another shortcoming in that the larger $Y_1$ means a thinner core when an external dimension is fixed (70 mm or less), resulting in higher magnetic resistance or magnetic saturation in a worst case.

The above condition, $Y_1-Y_2 \leq 0.5$ mm, prevents interference with a rotor magnet while allowing projections of phase separating members that serve as banks for winding a coil to be made as high as possible. Sticking to this condition enables functions of phase separating members to be fully displayed. The number of winding layers could be increased to five or more to further improve torque characteristics. However, in the present invention wherein toroidal winding is a must, a winding process would be significantly difficult. Substantially, winding of five or more layers will be hardly even, meaning the winding will be unstable, making it impossible to obtain a coil with winding of a uniform curvature. As a result, $Y_1$ has to be set to a larger value than necessary, leading to a disadvantage that not much improvement in torque characteristics can be accomplished for an increased number of winding layers.

FIG. 15 is an explanatory diagram of a fifth embodiment.

Obviously, in the embodiment shown in FIG. 14, the stator can be resin-molded with the phase separating members as the dimensional references. The phase separating members may be provided with coil hooking terminals. Alternatively, the core may be made up by forming a magnetic thin strip into a roll shape. Furthermore, auxiliary phase separating members 750 as shown in FIG. 15 may be employed to prevent dislocated winding.

The above descriptions have been made with reference to the engine throttle valve driving apparatus. Obviously, however, the present invention can be applied also to other types of flow rate adjusting apparatuses for general fluids.

The present invention provides the following advantages. In an actuator device with a valve, a stator of an actuator employs its own phase separating member to separate a coil so as to permit easier winding and increase occupancy of the coil. Moreover, end processing upon completing of a winding process, and a method for positioning and fixing of a finished stator in relation to a rotor have been improved, allowing a structure of an actuator with a valve that features good leaving to be provided. In particular, at installation to a device, required dimensions of the stator can be accurately set based on inside diameter dimensions and external dimensions of the phase separating members, providing an advantage in that the stator can be integrally installed in a throttle body. In addition, use of a roll-shaped soft magnetic thin strip as a stator core of an actuator makes it possible to provide an inexpensive cylindrical core with less iron loss. As a result, an inexpensive, high-performance actuator device with a valve can be configured.

What is claimed is:

1. A toroidal core type actuator comprising:
    a rotor composed of a permanent magnet rotatably supported on a rotary shaft thereof and has at least two magnetic poles of different polarity and
    a stator composed of a winding wrapped around a cylindrical core formed of a soft magnetic member disposed outside of said rotor via a minute air gap,
    wherein at least two phase separating members composed of a nonmagnetic material are arranged on said core equidistantly to each other, and coils are wound on winding regions provided between two adjacent phase separating members on said core at a substantially uniform density.

2. A toroidal core type actuator device with a valve for adjusting a flow rate in a pipe wherein a pipe through which a fluid is passed in provided with a rotary shaft to which a valve for adjusting a flow rate is fixed, an actuator and an angle sensor are arranged on an extended portion of said rotary shaft, and said valve is rotated with a torque corresponding to an output current value of an actuator driving circuit on the basis of an angle command value supplied to a control circuit so as to adjust a flow rate in the pipe;
    said actuator device with a valve comprising:
        a rotor composed of a permanent magnet rotatably supported on a rotary shaft thereof and has at least two magnetic poles of different polarity and
        a stator composed of a winding wrapped around a cylindrical core formed of a soft magnetic member disposed outside of said rotor via a minute air gap,
    wherein at least two phase separating members composed of a nonmagnetic material are arranged on said core equidistantly to each other, and coils are wound on winding regions provided between two adjacent phase separating members on said core at a substantially uniform density.

3. The actuator device with an engine throttle valve according to claim 2, wherein said fluid is air, and said actuator and said angle sensor are integrally installed in an engine throttle body.

4. The actuator device with a valve according to claim 3, wherein said phase separating members are made of a resin.

5. The actuator device with a valve according to claim 4, wherein said phase separating members are integrally provided with insulating portions for electrically insulating the core and the winding.

6. The actuator device with a valve according to claim 4, wherein at least one of said phase separating members is provided with a coil hooking terminal.

7. The actuator device with a valve according to claim 3, wherein said phase separating members have 10 degrees or less as central angle thereof on said core circumference.

8. The actuator device with a valve according to claim 3, wherein said cylindrical core is made by forming a soft and thin magnetic strip of a uniform width into a roll shape.

9. The actuator device with a valve according to claim 8, wherein said roll-shaped soft and thin magnetic strip has a tapered portion that gradually and continuously spreads from an innermost circumferential end of a rolling start.

10. The actuator device with a valve according to claim 9, wherein said cylindrical core is formed by wrapping a pipe-shaped soft magnetic core member with a soft and thin magnetic strip having a uniform width into a roll shape.

11. The actuator device with a valve according to claim 11, wherein said phase separating members are made of a resin.

12. The actuator device with a valve according to claim 2, wherein said phase separating members are integrally provided with insulating portions for electrically insulating the core and the winding.

13. The actuator device with a valve according to claim 11, wherein at least one of said phase separating members is provided with a coil hooking terminal.

14. The actuator device with a valve according to claim 2, wherein said phase separating members have 10 degrees or less as central angle thereof on said core circumference.

15. The actuator device with an engine throttle valve according to claim 2, wherein an external diameter of said cylindrical core of said actuator is 70 mm or less, a length $Y_1$ of an air gap formed by an inside diameter of said core and an outside diameter of said rotor magnet is set to be 1.5 mm $\leq Y_1 \leq 5$ mm, a length $Y_2$ of an air gap formed by innermost diameter of said phase separating member and said outside diameter of said rotor magnet is set to satisfy $Y_1-Y_2 \leqq 0.5$ mm, and two sets of coils wrapped around said core is formed of three or four layers.

16. The actuator device with a valve according to claim 2, wherein said cylindrical core is made by forming a soft and thin magnetic strip of a uniform width into a roll shape.

17. The actuator device with a valve according to claim 16, wherein said roll-shaped soft and thin magnetic strip has a tapered portion that gradually and continuously spreads from an innermost circumferential end of a rolling start.

18. The actuator device with a valve according to claim 17, wherein said cylindrical core is formed by wrapping a pipe-shaped soft magnetic core member with a soft and thin magnetic strip having a uniform width into a roll shape.

* * * * *